US006941153B2

United States Patent
Kim et al.

(10) Patent No.: US 6,941,153 B2
(45) Date of Patent: Sep. 6, 2005

(54) RADIO COMMUNICATION APPARATUS HAVING MORE CHANNEL CAPACITY AND LESS FEEDBACK INFORMATION, AND METHOD THEREFOR

(75) Inventors: Ki-ho Kim, Seoul (KR); Sung-jin Kim, Suwon (KR); Kwang-bok Lee, Ga-306 Faculty Apt., 244-2, Bongcheon 9-dong, Gwanak-gu, Seoul (KR); Kyu-jong Hwang, Daejeon (KR)

(73) Assignees: Samsung Electronics Co., Ltd., Kyungki-do (KR); Kwang-bok Lee, Seoul (KR)

( * ) Notice: Subject to any disclaimer, the term of this patent is extended or adjusted under 35 U.S.C. 154(b) by 499 days.

(21) Appl. No.: 10/139,628

(22) Filed: May 7, 2002

(65) Prior Publication Data

US 2002/0187753 A1 Dec. 12, 2002

(30) Foreign Application Priority Data

May 7, 2001 (KR) ........................................ 2001-24705

(51) Int. Cl.[7] .............................. H04B 7/00; H04Q 7/20
(52) U.S. Cl. .......................... 455/522; 455/69; 455/103
(58) Field of Search ................................. 455/522, 103, 455/562.1, 69, 88, 67.11, 67.13, 272, 278.1

(56) References Cited

U.S. PATENT DOCUMENTS

| | | | | |
|---|---|---|---|---|
| 6,192,256 B1 | * | 2/2001 | Whinnett | ................. 455/562.1 |
| 2004/0077378 A1 | * | 4/2004 | Kim et al. | ................. 455/562.1 |

FOREIGN PATENT DOCUMENTS

| | | |
|---|---|---|
| EP | 0973283 | 1/2000 |
| EP | 1207645 | 5/2002 |
| WO | 00/72464 | 11/2000 |

OTHER PUBLICATIONS

Foschini et al., On Limits of Wireless Communications in a Fading Environment, etc.. 1998, pp.: 311–335.
Shiu et al., Fading Correlation and its Effect on the Capacity of Multielement, etc., Mar. 2000 vol. 48, No. 3, pp. 502–513.
Calculation of the Rate Distortion Function, 13.3.3 Simultaneous Description of Independent Gaussian Random Variables, pp. 347–349.
Matrix Computations—Interative Methods for Linear Systems, pp. 362–372.

* cited by examiner

Primary Examiner—Nguyen T. Vo
(74) Attorney, Agent, or Firm—Lee & Morse, P.C.

(57) ABSTRACT

A radio communication apparatus having maximized channel capacity, and a method thereof, preferably includes a transmitter having a plurality of transmitting antennae, wherein each transmitting antenna transmits on a channel using a transmission power that is allocated and a base-band signal that is modulated according to a feedback signal from a receiver. The feedback signal is preferably derived in the receiver using an algorithm that analyzes and processes a previously received signal from the plurality of transmitting antennae. Only information on the amount of transmission power to be allocated to a first transmitting antenna from the plurality of transmitting antennae is fed back. Therefore, the channel capacity may be maximized while minimizing the amount of information in a feedback signal. Further, decoupling conversion is not required, thereby reducing the size and cost of manufacturing hardware.

13 Claims, 4 Drawing Sheets

RADIO COMMUNICATION APPARATUS HAVING MORE CHANNEL CAPACITY AND LESS FEEDBACK INFORMATION, AND METHOD THEREFOR

BACKGROUND OF THE INVENTION

1. Field of the Invention

The present invention relates to radio communication using multiple-receiving/transmitting antennae. More particularly, the present invention relates to a radio communication apparatus and method for allocating transmission power to maximize the channel capacity.

2. Description of the Related Art

Channel response information between a transmitter and a receiver should be known to the transmitter and the receiver to detect the optimum channel capacity in radio communication. However, in general, it is assumed that the receiver knows channel response information, while the transmitter does not. Thus, channel response information must be fed back to the transmitter from the receiver. Here, 'channel response information,' as used in radio communication using multiple antennae, is information regarding the channel response between each transmitting antenna and each receiving antenna. The channel response information increases in proportion to the number of transmitting/receiving antennae. Therefore, the channel capacity of a radio communication apparatus using multiple antennae is increased in proportion to the number of antennae used. However, in this case, the amount of information to be fed back to the transmitter is also increased in proportion to the number of antennae.

Conventionally, allocation of transmission power is performed in a radio communication apparatus by an equal power allocation method and a water-filling power allocation method.

In the equal power allocation method, transmission power is allocated equally to base-band signals of transmitting antennae when channel response information is not fed back from a receiver to a transmitter. With this method, the channel capacity $C_{eq}$ of a conventional radio communication apparatus can be calculated by the following equation:

$$C_{eq} = \log_2 \det\left[I'_{n'_R} + \frac{P'_T}{n'_T \sigma'^2_N} H' H'^h\right] \quad (1)$$

wherein I' denotes an identify matrix, $n'_T$ denotes the number of—transmitting antennae, $n'_R$ denotes the number of—receiving antennae, $P'_T$ denotes the total amount of power available by the transmitting antennae, H' denotes a channel response matrix having a size of $n'_R \times n'_T$, $\sigma'^2_N$ denotes the dispersion of received Gaussian noise, det denotes a determinant, and $H'^h$ denotes the conjugate transpose matrix of H'.

The equal power allocation method is advantageous in that channel response information need not be fed back from a receiver to a transmitter. Disadvantageously, the equal power allocation method causes the channel capacity to be less than in a radio communication method that feeds back channel response information from a receiver to a transmitter.

For a case where all channel response information is estimated by a receiver and then is fed back to a transmitter from the receiver, using the water-filling power allocation method, the transmitter may allocate transmission power to base-band signals using the limited total power as the determinant for maximizing the channel capacity. In this method, a conventional radio communication apparatus having multi-input and multi-output is converted into a radio communication apparatus having several parallel elements, with each having single inputs and single outputs, by decoupling conversion for completely canceling interference between signals. In such a decoupling conversion, a V matrix in the transmitter and a $U^h$ matrix in the receiver are used to diagonalize the channel response matrix H' through single value decomposition, using the following equation:

$$UDV^h H' = UDVh \quad (2)$$

A conventional water-filling power allocation method for maximizing channel capacity may be derived with the channel capacity $C_{wat}$ of a conventional radio communication apparatus, which is calculated by the following equation:

$$C_{wat} = \sum_{k=1}^{n'} \log_2\left(1 + \frac{P'_k \lambda'_k}{\sigma'^2_N}\right) \quad (3)$$

wherein n' is $\min(n'_T, n'_R)$, $P'_k$ denotes a power allocation value of each sub-channel, and $\lambda'_k$ denotes the $k^{th}$ eigenvalue of $H'^h H'$.

In the water-filling power allocation method, the power allocation value $p'_k$ of each sub-channel that maximizes the channel capacity $C_{wat}$ is measured using a 'Lagrange multiplier' as follows:

$$p'_k = \begin{cases} \frac{1}{\lambda'_0} - \frac{\sigma'^2_N}{\lambda'_k}, & \text{if } \lambda'_k > \frac{\lambda'_0}{\sigma'^2_N} \\ 0, & \text{otherwise} \end{cases} \quad (4)$$

wherein $\lambda'_0$ denotes an invariable obtained from the limited total power $P'_T$.

When the water-filling power allocation method is adopted, an $n'_R n'_T$ complex number, that is $2n'_R n'_T$ real numbers must be fed back to a transmitter from a receiver in a conventional radio communication apparatus. Therefore, with the water-filling power allocation method, the channel capacity can be maximized in a conventional radio communication apparatus, but a large amount of information must be fed back to the transmitter from a receiver.

SUMMARY OF THE INVENTION

It is a first feature of an embodiment of the present invention to provide a radio communication apparatus that maximizes a channel capacity as well as reduces an amount of information to be fed back from a receiver to a transmitter.

It is a second feature of an embodiment of the present invention to provide a radio communication method performed by such a radio communication apparatus with maximized channel capacity.

Accordingly, there is provided a radio communication apparatus having maximum channel capacity, including: a transmitter for allocating transmission power of each of a plurality of base-band signals of each transmitting antenna containing an information signal input from outside, using feedback information recovered from a feedback signal, modulating the base-band signals with the allocated transmission power, and converting the base-band signals into RF signals and transmitting the RF signals; and a receiver for estimating a channel response experienced during the transmission of the received RF signals, recovering the information signal from the RF signals using the estimated channel response, and transmitting information regarding the transmission power of each transmitting antenna, which is calculated based on the estimated channel response and is to be allocated, as the feedback signal to the transmitter by radio.

The transmitter preferably includes: a plurality of first receiving antennae for receiving the feedback signal transmitted from the receiver; a feedback information recovering unit for recovering the feedback information from the feedback signal output from the first receiving antennae and for outputting the recovered feedback information; a first base-band processor for allocating the transmission power to each of the base-band signals of each of a plurality of transmitting antennae using the feedback information and modulating the base-band signals with the allocated transmission power by a predetermined modulation method; an RF processor for converting the base-band signals modulated by the first base-band processor into RF signals, and outputting the RF signals; and at least one of a plurality of first transmitting antennae for transmitting the RF signals output from the RF processor to the receiver.

The receiver preferably includes: a plurality of second receiving antennae for receiving the RF signals transmitted from the plurality of first transmitting antennae; a second base-band processor for converting the RF signals received by the plurality of second receiving antennae into the base-band signals and processing the converted base-band signals; a channel estimator for estimating the channel response from a signal on a pilot symbol which is selected among the signals processed by the second base-band processor, and outputting the estimated channel response; an information recovering unit for recovering the information signal from the signals processed by the second base-band processor using the estimated channel response; an allocation power calculator for calculating the transmission power to be allocated to each of the base-band signals of the plurality of first transmitting antennae using the estimated channel response; an information feedback unit for modulating the transmission power calculated by the allocated power calculator, converting the modulated transmission power into RF signals and outputting the RF signals; and a plurality of second transmitting antennae for transmitting the RF signals output from the information feedback unit as the feedback signal to the plurality of first receiving antennae.

The allocation power calculator preferably determines powers $p_1, p_2, \ldots, p_{n_T}$, which maximize channel capacity $C_{prop}$ as the transmission power to be allocated to the base-band signals of the plurality of first transmitting antennae, using the following equation:

$$C_{prop} = \log_2 \det\left[I_{n_R} + \frac{1}{\sigma_N^2} HPH^h\right],$$

$$\sum_{k=1}^{n_T} p_k \leq p_T, P: \text{Diagonal}\{p_1, p_2, \ldots, p_{n_T}\}$$

wherein det denotes a determinant, I denotes a unit matrix, $n_R$ indicates the number of the second receiving antennae, $n_T$ denotes the number of the first transmitting antennae, $\sigma_N^2$ denotes the dispersion of received Gaussian noise, H denotes a matrix of size $n_R \times n_T$ regarding the estimated channel response, $H^h$ denotes conjugate transpose matrix of H, $P_T$ denotes the total amount of power available in the plurality of first transmitting antennae, and P denotes a diagonal matrix.

The allocation power calculator further preferably calculates the determinant det using the following equation:

$$\det\left[I_{n_R} + \frac{1}{\sigma_N^2} HPH^h\right] =$$

$$\det\left[I_{n_R} + \frac{1}{\sigma_N^2} \sum_{i=1}^{n_T} p_i H(i) H^h(i)\right] = \Bigg\{ 1 + \sum_{i_1=1}^{n_T} \frac{p_{i_1}}{\sigma_N^2} \det[(H(i_1))^h H(i_1)] +$$

$$\sum_{i_1=1}^{n_T} \sum_{i_2 > i_1}^{n_T} \frac{p_{i_1}}{\sigma_N^2} \frac{p_{i_2}}{\sigma_N^2} \det[H^h(i_1, i_2) H(i_1, i_2)] +$$

$$\sum_{i_1=1}^{n_T} \sum_{i_2 > i_1}^{n_T} \sum_{i_3 > i_2}^{n_T} \frac{p_{i_1}}{\sigma_N^2} \frac{p_{i_2}}{\sigma_N^2} \frac{p_{i_3}}{\sigma_N^2} \det[H^h(i_1, i_2, i_3) H(i_1, i_2, i_3)] +$$

$$\ldots + \sum_{i_1=1}^{n_T} \sum_{i_1 > i_2}^{n_T} \ldots \sum_{i_{n_T-2} > i_{n_T-2}}^{n_T} \frac{p_{i_1}}{\sigma_N^2} \frac{p_{i_2}}{\sigma_N^2} \ldots \frac{p_{n_T-1}}{\sigma_N^2}$$

$$\det[H^h(i_1, i_2, \ldots, i_{n_T-1}) H(i_1, i_2, \ldots, i_{n_T-1})] +$$

$$\sum_{i_1=1}^{n_T} \sum_{i_2 > i_2}^{n_T} \ldots \sum_{i_{n_T-1} > i_{n_T-2}}^{n_T} \sum_{i_{n_T} > i_{n_T-1}}^{n_T} \frac{p_{i_1}}{\sigma_N^2} \frac{p_{i_2}}{\sigma_N^2} \ldots \frac{p_{n_T-1}}{\sigma_N^2} \frac{p_{n_T}}{\sigma_N^2}$$

$$\det[H^h(i_1, i_2, \ldots, i_n) H(i_1, i_2, \ldots, i_{n_T})] \Bigg\}$$

There is also provided a radio communication method performed by such a radio communication apparatus having maximized channel capacity, including: allocating transmission power of each of a plurality of base-band signals of a plurality of first transmitting antennae, which contain an information signal given from outside, using feedback information recovered from a feedback signal, modulating the plurality of base-band signals with the allocated transmission power, converting the modulated base-band signals into RF signals, and transmitting the RF signals; and estimating the channel response experienced during the transmission of the RF signals, recovering the information signal from the RF signals using the estimated channel response, and transmitting the feedback signal containing information regarding the transmission power to be allocated, calculated using the estimated channel response, to the transmitter by radio.

In the foregoing method, allocating transmission power preferably includes: determining whether the information signal is a pilot symbol; checking for the presence of the feedback information if it is determined that the information signal is not the pilot symbol; recovering the feedback signal from the received feedback signal if it is determined that the feedback information is present; allocating the transmission power of the plurality of base-band signals using the recovered feedback information; modulating the plurality of base-band signals with the allocated transmission power by a predetermined modulation method; and converting the converted base-band signals into the RF signals, and transmitting the RF signals to the receiver. The transmission power of the plurality of base-band signals corresponding to the pilot symbol may be equally allocated if, upon checking, either the information signal is the pilot symbol or the feedback information is not present. Further, the presence of the feedback information may be checked periodically or continuously.

In the foregoing method, estimating the channel response preferably includes: receiving the RF signals transmitted by the transmitter; converting the received RF signals into the plurality of base-band signals and processing the plurality of base-band signals; determining whether the processed base-band signals include the pilot symbol. The channel response may be estimated from the processed base-band signals that represent the pilot symbol, if the processed base-band signals are the pilot symbols. Alternatively, the information signal may be recovered from the processed base-band signals using the estimated channel response, if it is determined that the processed base-band signals are not the pilot symbols. The transmission power to be allocated to the plurality of base-band signals is then preferably calculated using the estimated channel response, and a signal is generated for modulating the calculated transmission power and is converted into RF signals and transmitted as the feedback signals to the transmitter.

Hereinafter, the structure and operations of a radio communication apparatus with maximized channel capacity according to an embodiment of the present invention will be described with reference to the accompanying drawings.

BRIEF DESCRIPTION OF THE DRAWINGS

The above features and advantages of the present invention will become more apparent to one of ordinary skill in the art by describing in detail a preferred embodiment thereof with reference to the attached drawings in which.

DETAILED DESCRIPTION OF THE INVENTION

Korean Patent Application No. 2001-24705, filed May 7, 2001, and entitled: "Radio Communication Apparatus Having More Channel Capacity and Less Feedback Information, and Method Therefor," is incorporated by reference herein in its entirety.

Figure 1:
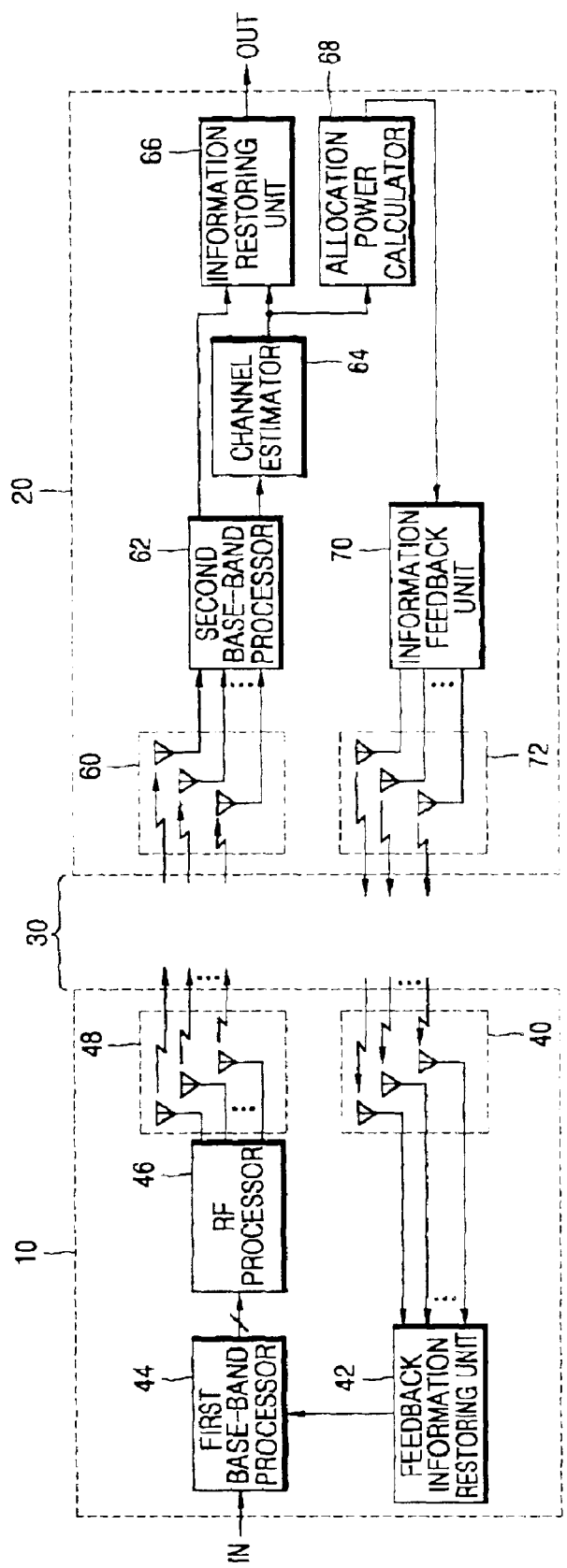
FIG. 1 illustrates a block diagram of a radio communication apparatus with maximized channel capacity according to an embodiment of the present invention.

FIG. 1 illustrates a block diagram of a radio communication apparatus with maximized channel capacity, having a transmitter 10 and a receiver 20 according to an embodiment of the present invention. Here, reference numeral 30 denotes a channel.

The transmitter 10 recovers feedback information from a feedback signal transmitted from the receiver 20 via radio. Transmission power is allocated to base-band signals, which include an information signal that is input from the outside via an input terminal IN using the recovered feedback signal. The base-band signals are modulated with the allocated transmission power, and converted into radio-frequency (RF) signals, which are transmitted to the receiver 20 via the channel 30.

For these operations, the transmitter 10 preferably includes first receiving antennae 40, a feedback information restoring unit 42, a first base-band processor 44, an RF processor 46, and first transmitting antennae 48.

The first receiving antennae 40 receive a feedback signal that is transmitted from the receiver 20 by radio via the channel 30, and output the received feedback signal to the feedback information restoring unit 42, which recovers feedback information and outputs the recovered feedback information to the first base-band processor 44.

The first base-band processor 44 determines a method of modulating the information signal input from the input terminal IN, processes the base-band signals, and then allocates transmission power for each of the base-band signals using the feedback information input from the feedback information restoring unit 42. For instance, the first base-band processor 44 performs a process on the base-band signals such as pulse shaping or base-band filtering. When the transmission power is allocated to each of the base-band signals, a modulation level of each base-band signal is determined. Further, the first base-band processor 44 modulates the base-band signals, with the allocated transmission power on the basis of the determined modulating method, and outputs the modulated base-band signals to the RF processor 46. The RF processor 46 converts the modulated base-band signals into RF signals, and outputs the RF signals to the first transmitting antennae 48, which transmit the RF signals to the receiver 20 by radio via the channel 30.

In receiving the transmitted RF signals, the receiver 20 estimates a channel response of the received RF signals, recovers an information signal from the RF signals using the estimated channel response, and calculates transmission power to be allocated, using the estimated channel response, as a feedback signal, which is transmitted to the transmitter 10 by radio via the channel 30.

For these operations, the receiver 20 preferably includes second transmitting antennae 60, a second base-band processor 62, a channel estimator 64, an information restoring unit 66, an allocation power calculator 68, an information feedback unit 70, and second transmitting antennae 72.

The second receiving antennae 60 receive RF signals transmitted from the first transmitting antennae 48, and output the received RF signals to the second base-band processor 62, which converts the RF signals into base-band signals, performs signal processing, such as base-band filtering, on the converted base-band signals, and outputs the processed signals to the channel estimator 64 and the information restoring unit 66.

Next, the channel estimator 64 estimates channel response from the result on a pilot symbol, which is included in the transmission. The pilot symbol is already known to the transmitter 10 and the receiver 20 before starting communication and selected from among the resulting signals processed by the second base-band processor 62. Channel estimator 64 outputs the estimated channel response to the information restoring unit 66 and the allocation power calculator 68. The information restoring unit 66 recovers an information signal from the resulting signals processed by the second base-band processor 62, using the estimated channel response from the channel estimator 64 and outputs the recovered information signal via an output terminal OUT. For the recovery of the information signal, the information restoring unit 66 may include equalizers (not shown) of the same number as may be included in the first transmitting antennae 48.

The allocation power calculator 68 calculates a plurality of transmission powers, which are to be allocated to each of the base-band signals of the first transmitting antennae 48, using the estimated channel response from the channel estimator 64, such that the channel capacity may be maximized. The allocation power calculator 68 then quantizes the calculated transmission powers and outputs the quantized power to the information feedback unit 70.

According to the present invention, the allocation power calculator 68 calculates power $P_1, P_2, \ldots, P_{n_T}$ for maximizing the channel capacity $C_{prop}$ as transmission power to be allocated to base-band signals using the following equation:

$$C_{prop} = \log_2 \det\left[I_{n_R} + \frac{1}{\sigma_N^2} HPH^h\right], \quad (5)$$

$$\sum_{k=1}^{n_T} p_k \leq P_T, \ P: \text{Diagonal}\{p_1, p_2, \ldots, p_{n_T}\}$$

wherein I denotes a unit matrix, $n_R$ indicates the number of the second receiving antennae 60, $n_T$ denotes the number of the first transmitting antennae 48, $\sigma_N^2$ denotes the dispersion of received Gaussian noise, H denotes a matrix of size $n_R \times n_T$ with regard to estimated channel response, $H^h$ denotes the conjugate transpose matrix of H, $P_T$ denotes the total amount of power available in the first transmitting antennae 48, P denotes a diagonal matrix indicating transmission power allocated to each of the first transmitting antennae 48.

It is noted that a polynomial of order $n=\min(n_T, n_R)$ is obtained in a log function if equation 5 is expanded with regard to the transmission powers $P_1, P_2, \ldots, P_{n_T}$ to be allocated to the first transmitting antennae 48.

According to the present invention, the allocation power calculator 68 calculates the determinant of equation 5 as follows:

$$\det\left[I_{n_R} + \frac{1}{\sigma_N^2} HPH^h\right] = \qquad (6)$$

$$\det\left[I_{n_R} + \frac{1}{\sigma_N^2}\sum_{i=1}^{n_T} p_i H(i)H^h(i)\right] = \Bigg\{ 1 + \sum_{i_1=1}^{n_T} \frac{p_{i_1}}{\sigma_N^2}\det[H(i_1)^h H(i_1)] +$$

$$\sum_{i_1=1}^{n_T}\sum_{i_2>i_1}^{n_T} \frac{p_{i_1}}{\sigma_N^2}\frac{p_{i_2}}{\sigma_N^2}\det[H^h(i_1,i_2)H(i_1,i_2)] +$$

$$\sum_{i_1=1}^{n_T}\sum_{i_2>i_1}^{n_T}\sum_{i_3>i_2}^{n_T} \frac{p_{i_1}}{\sigma_N^2}\frac{p_{i_2}}{\sigma_N^2}\frac{p_{i_3}}{\sigma_N^2}\det[H^h(i_1,i_2,i_3)H(i_1,i_2,i_3)] +$$

$$\ldots + \sum_{i_1=1}^{n_T}\sum_{i_2>i_2}^{n_T}\ldots\sum_{i_{n_T-1}>i_{n_T-2}}^{n_T} \frac{p_{i_1}}{\sigma_N^2}\frac{p_{i_2}}{\sigma_N^2}\ldots\frac{p_{n_T-1}}{\sigma_N^2}$$

$$\det[H^h(i_1,i_2,\ldots,i_{n_T-1})H(i_1,i_2,\ldots,i_{n_T-1})] +$$

$$\sum_{i_1=1}^{n_T}\sum_{i_2>i_2}^{n_T}\ldots\sum_{i_{n_T-1}>i_{n_T-2}}^{n_T}\sum_{i_{n_T}>i_{n_T-1}}^{n_T} \frac{p_{i_1}}{\sigma_N^2}\frac{p_{i_2}}{\sigma_N^2}\ldots\frac{p_{n_T-1}}{\sigma_N^2}\frac{p_{n_T}}{\sigma_N^2}$$

$$\det[H^h(i_1,i_2,\ldots,i_n)H(i_1,i_2,\ldots,i_{n_T})]\Bigg\}$$

wherein $H(i, j, \ldots)$ denotes a sub-matrix of H consisting of i, j, ..., and equation 6 is obtained irrespective of a difference between $n_R$ and $n_T$. Here, it is possible to calculate the values of transmission powers $P_1, P_2, \ldots, P_{n_T}$ to be allocated to the first transmitting antennae 48 that maximize the determinant of equation 6, using a numerical method such as a steepest decent method, Newton's method, and a conjugate gradient method, which are disclosed in a publication entitled "Numerical Analysis" written by David Kincaid and Ward Cheney, published by Pacific Grove, Calif., 1991.

The information feedback unit 70 modulates values calculated by the allocation power calculator 68, converts the modulated values into RF signals, and outputs the RF signals to the second transmitting antennae 72, which transmit the RF signals as feedback signals, which contain information regarding transmission power to be allocated, to the first receiving antennae 40 by radio via the channel 30. For this operation, the information feedback unit 70 performs the same functions as the first base-band processor 44 and the RF processor 46. In other words, as the first base-band processor 44, the information feedback unit 70 considers values calculated by the allocation power calculator 68 as base-band signals, and processes and modulates the values. Also, similar to the RF processor 46, the information feedback unit 70 converts the modulated values into RF signals, and outputs the RF signals to the second transmitting antennae 72.

In the event that the receiver 20 feeds back information regarding transmission power to be allocated to each of the first transmitting antennae 48 and the total amount of power $P_T$ is limited, feedback signals consist of $n_T-1$ real numbers. That is, $n_T-1$ real numbers are fed back to the transmitter 10 from the receiver 20 as a feedback signal.

Hereinafter, a radio communication method, according to an embodiment of the present invention, performed by the radio communication apparatus illustrated in FIG. 1 will be described with reference to the accompanying drawings.

Figure 2:
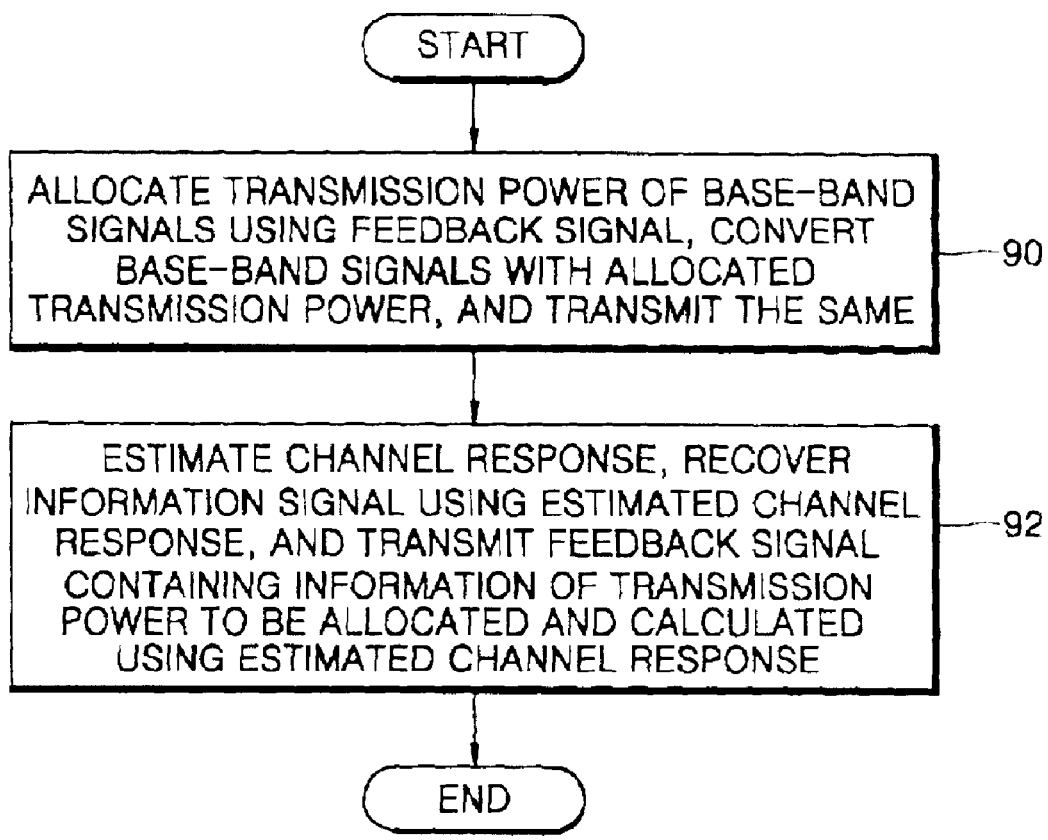
FIG. 2 illustrates a flow chart explaining a radio communication method performed by the radio communication apparatus of FIG. 1.

FIG. 2 illustates a flow chart of a preferred method for performing radio communication using the radio communication apparatus of FIG. 1. In this method, in step 90, base-band signals are modulated and transmitted with the transmission power allocated using feedback information. Then, in step 92, an information signal is recovered using a channel response estimated from RF signals received and information regarding the transmission power allocated is obtained.

In detail, in step 90, the transmitter 10 of FIG. 1 allocates the transmission power to each of base-band signals containing an information signal input from the outside, using feedback information recovered from a feedback signal, modulates the base-band signals with the allocated transmission power, converts the modulated base-band signals into RF signals, and transmits the RF signals to the receiver 20.

Figure 3:
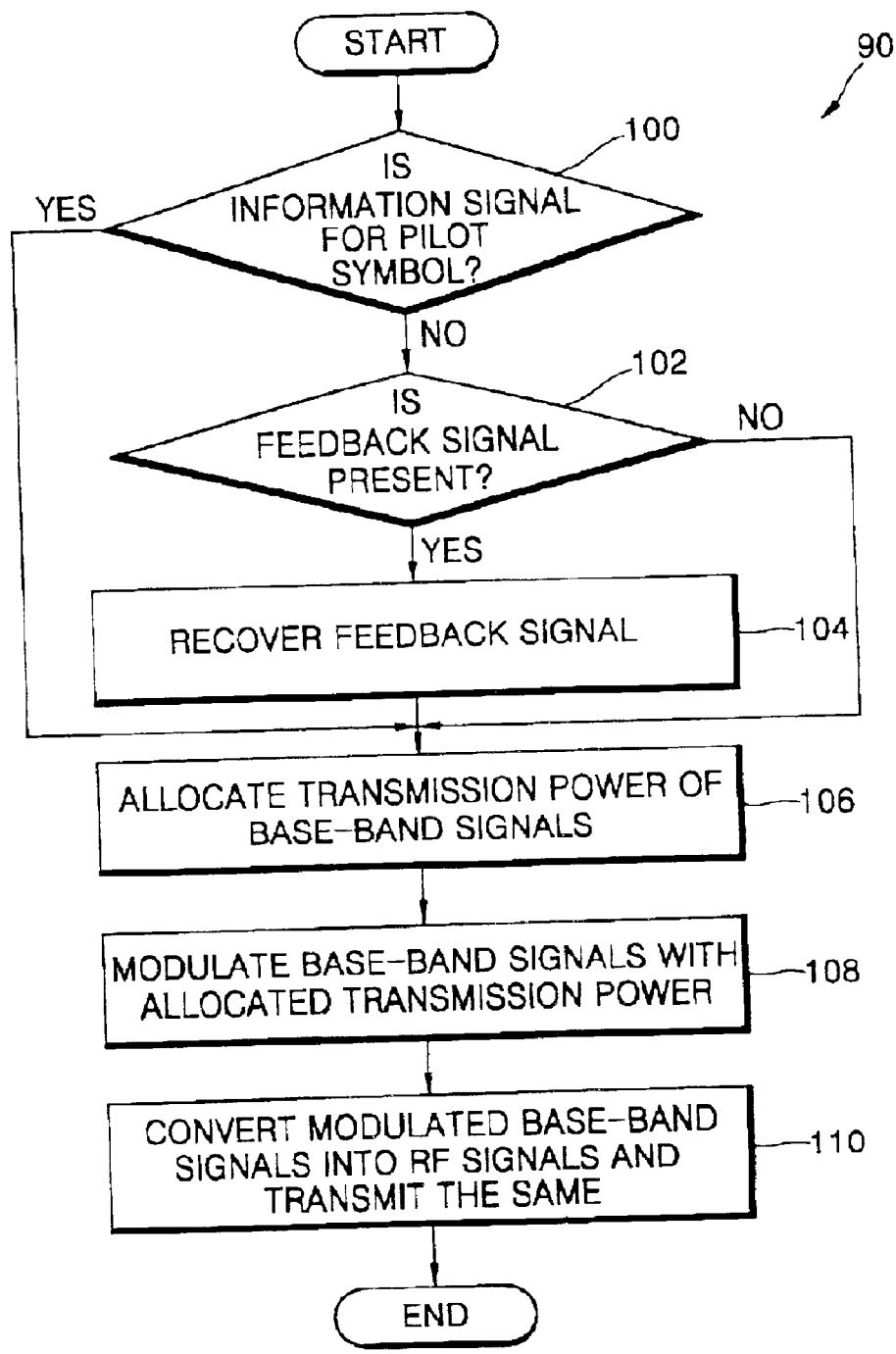
FIG. 3 illustrates a flow chart explaining a preferred embodiment of step 90 of FIG. 2 according to an embodiment of the present invention.

FIG. 3 illustrates a flow chart of a preferred embodiment of step 90 of FIG. 2 according to the present invention. In this embodiment, in steps 100 through 106, transmission power applied to the base-band signals is allocated equally or unequally according to the type of an information signal and according to whether feedback information exists or not. Then, in steps 108 and 110, the base-band signals, which are modulated with the allocated transmission power, are converted into RF signals and transmitted.

In detail, according to the preferred embodiment of the present invention of step 90 of FIG. 2 illustrated in FIG. 3, in step 100, the transmitter 10 of FIG. 1 determines if an information signal input via the input terminal IN is a pilot symbol. If it is determined that the information signal is not a pilot symbol, in step 102, the transmitter 10 checks for the presence of feedback information. To perform step 102, the transmitter 10 checks if the feedback signal is transmitted from the receiver 10. If feedback information is present, in step 104, the transmitter 10 recovers the feedback information from the received feedback signal.

Alternatively, if it is determined that the information signal is the pilot symbol or that the feedback information is not present, in step 106, the transmitter 10 allocates transmission power for base-band signals. For example, after step 104, the transmitter 10 may unequally allocate transmission power for the base-band signals using the feedback information, or may equally allocate transmission power for the base-band signals corresponding to the pilot symbol, if it is determined that the information signal is the pilot symbol or the feedback information is not present. However, according to another embodiment of the present invention of step 90 of FIG. 2, if it is determined that the feedback information is not present after checking once in step 102, the presence of the feedback information may be checked again instead of proceeding to step 104 or 106. In fact, the presence of the feedback information can be checked continuously in step 102 unlike the steps shown in FIG. 3.

After step 106, in step 108, the transmitter 10 modulates the base-band signals with the allocated transmission power on the basis of a predetermined modulation method. The aforementioned steps 100 through 108 are preferably performed by the first base-band processor 44 of FIG. 1.

After step 108, in step 110, the RF processor 46 converts the base-band signals, which have been modulated by the first base-band processor 44, into RF signals, and transmits the RF signals to the receiver 20.

In step 90 of FIG. 2, the receiver 20 receives RF signals transmitted from the transmitter 10 by radio via the channel 30, estimates a channel response for the transmitted RF signals, recovers information signals from the RF signals using the estimated channel response, generates and transmits a feedback signal, which contains information regarding transmission power to be allocated and calculated using the estimated channel response, to the transmitter 10 by radio.

Figure 4:
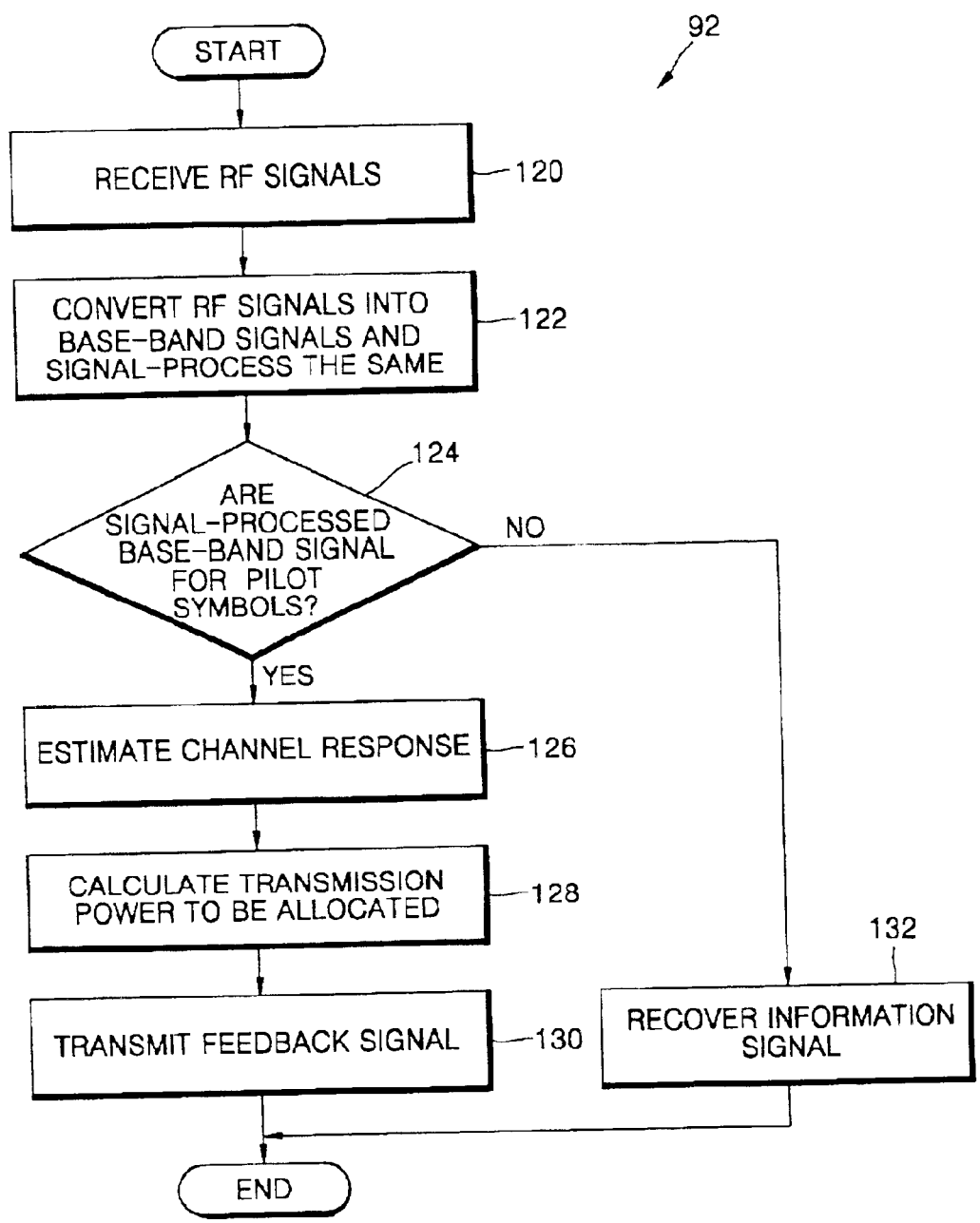
FIG. 4 illustrates a flow chart explaining a preferred embodiment of step 92 of FIG. 2 according to an embodiment of the present invention.

FIG. 4 illustrates a flow chart of a preferred embodiment according to the present invention of step 92 of FIG. 2 performed by the receiver 20 of FIG. 1. In this embodiment, in steps 120 through 132, an information signal is recovered or a feedback signal is obtained, depending on whether values, which were obtained by converting received RF signals into base-band signals and by processing the converted result, are pilot symbols.

In detail, in step 120, the second receiving antennae 60 receive RF signals transmitted in step 90. In step 122, the second base-band processor 62 of FIG. 1 converts the received RF signals into base-band signals, and processes the converted base-band signals. After step 122, in step 124, the second base-band processor 62 determines whether the processed signals are pilot symbols.

If it is determined that the processed signals are pilot symbols, in step 126, the second base-band processor 62 outputs the processed signals to the channel estimator 64, which then estimates the channel response from the signal-processed result for pilot symbols. After step 126, in step 128, the allocation power calculator 68 calculates transmission power to be allocated to the base-band signals output from the first transmitting antennae 48, using the channel response estimated by the channel estimator 64. After step 128, in step 130, the information feedback unit 70 modulates values calculated by the allocation power calculator 68, converts the modulated values into RF signals, and transmits the RF signals as the feedback signal to the transmitter 10 by radio via the second transmitting antennae 72.

However, if it is determined that the processed signals in step 124 are not the pilot symbols, in step 132, the information restoring unit 66 recovers an information signal from the processed results output from the second base-band processor 62, using the estimated channel response, and outputs the recovered information signal via an output terminal OUT.

As a result, in a radio communication apparatus and a method therefor according to the present invention, channel capacity can be obtained much more than with a conventional equal power allocation method by unequal power assignment of the first transmitting antennae 48.

Also, with a radio communication apparatus and a method therefor according to the present invention, it is possible to obtain almost a similar amount of channel capacity while reducing the amount of feedback information as compared to a conventional water-filling power allocation method. For instance, in the conventional water-filling power allocation method, all elements of the channel response matrix H' must be fed back from a receiver to a transmitter, and thus the amount of information to be fed back is $(2n'_R n'_T)N_q$ (wherein $N_q$ represents the number of bits that is required for quantizing the real number) if elements of the channel response matrix H' are complex numbers. Further, if V and P are fed back instead of H', the amount of information to be fed back is $(n'^2_T+n'_T-1)N_q$. That is, a total of $n'^2_T$ complex numbers must be fed back because the decoupling matrix V is a unitary matrix of $n'_R \times n'_T$, and $n'_T-1$ complex numbers must be fed back because the degree of freedom in a total of $n'_T$ channels is reduced by 1 due to limited power capacity. However, in the radio communication apparatus and the method therefor according to the present invention, only information that represents the amount of transmission power to be allocated to the first transmitting antennae 48 is fed back, and thus the amount of information fed back to the transmitter 10 from the receiver 20 is $(n_T-1)N_q$. Thus, the amount of information to be fed back may be further reduced from the amount of information to be fed back in a conventional water-filling power allocation method.

While the present invention has been particularly shown and described with reference to a preferred embodiment thereof, it will be understood by those of ordinary skill in the art that various changes in form and details may be made therein without departing from the spirit and scope of the invention as defined by the appended claims.

As described above, in the radio communication apparatus with maximized channel capacity and the method therefore according to the present invention, only information on the amount of transmission power to be allocated to first transmitting antennae is fed back, unlike in a conventional radio communication apparatus and a method wherein all channel response information is fedback from a receiver to a transmitter. As a result, according to the present invention, the channel capacity may be maximized while minimizing the amount of information in a feedback signal. Further, decoupling conversion is not required, thereby reducing the size and cost of manufacturing hardware.

What is claimed is:

1. A radio communication apparatus having maximum channel capacity, comprising:
   a transmitter for determining whether an information signal is a pilot symbol, checking the presence of feedback information if it is determined that the information signal is not the pilot symbol, recovering the feedback signal from a received feedback signal if it is determined that the feedback information is present, allocating transmission power of each of a plurality of base-band signals of each transmitting antenna containing the information signal input from outside, using the feedback information recovered from the feedback signal, modulating the base-band signals with the allocated transmission power, and converting the base-band signals into RF signals and transmitting the RF signal; and a receiver for estimating a channel response experienced during the transmission of received RF signals, recovering the information signal from the received RF signals using the estimated channel response, and transmitting information regarding the transmission power of each transmitting antenna, which is calculated based on the estimated channel response and is to be allocated, as the feedback signal to the transmitter by radio.

2. The radio communication apparatus as claimed in claim 1, wherein the transmitter comprises:

a plurality of first receiving antennae for receiving the feedback signal transmitted from the receiver;

a feedback information recovering unit for recovering the feedback information from the feedback signal output from the plurality of first receiving antennae, and for outputting the recovered feedback information;

a first base-band processor for allocating the transmission power to each of the base-band signals of each of a plurality of transmitting antennae using the feedback information and modulating the base-band signals with the allocated transmission power by a predetermined modulation method;

an RF processor for converting the base-band signals modulated by the first base-band processor into RF signals, and outputting the RF signals; and at least one of a plurality of first transmitting antennae for transmitting the RF signals output from the RF processor to the receiver.

3. The radio communication apparatus as claimed in claim 2, wherein the receiver comprises:

a plurality of second receiving antennae for receiving the RF signals transmitted from the plurality of first transmitting antennae;

a second base-band processor for converting the RF signals received by the plurality of second receiving antennae into the base-band signals and processing the converted base-band signals;

a channel estimator for estimating the channel response from a signal on a pilot symbol which is selected among the signals processed by the second base-ban processor, and outputting the estimated channel response;

an information recovering unit for recovering the information signal on the signals processed by the second base-band processor using the estimated channel response;

an allocation power calculator for calculating the transmission power to be allocated to each of the base-band signals of the plurality of first transmitting antennae using the estimated channel response;

an information feedback unit for modulating the transmission power calculated by the allocated power calculator, converting the modulated transmission power into RF signals and outputting the RF signals; and a plurality of second transmitting antennae for transmitting the RF signals output from the information feedback unit as the feedback signal to the plurality of first receiving antennae.

4. The radio communication apparatus as claimed in claim 3, wherein the allocation power calculator determines powers $p_1, p_2, \ldots, p_{n_T}$, which maximize channel capacity $C_{prop}$ as the transmission power to be allocated to the base-band signal of the plurality of first transmitting antennae, using the following equation:

$$C_{prop} = \log_2 \det\left[I_{n_R} + \frac{1}{\sigma_N^2} HPH^h\right],$$

$$\sum_{k=1}^{n_T} p_k \le p_T, \, P : \text{Diagonal}\{p_1, p_2, \ldots, p_{n_T}\}$$

wherein det denotes a determinant, I denotes a unit matrix, $n_R$ indicates the number of the second receiving antennae, $n_T$ denotes the number of the first transmitting antennae, $\sigma_N^2$ denotes the dispersion of received Gaussian noise, H denotes a matrix of size $n_R \times n_T$ regarding the estimated channel response, $H^h$ denotes conjugate transpose matrix of H, $P^T$ denotes the total amount of power available in the plurality of first transmitting antennae, and P denotes a diagonal matrix.

5. The radio communication apparatus as claimed in claim 4, wherein the allocation power calculator calculates the determinant det using the following equation:

$$\det\left[I_{n_R} + \frac{1}{\sigma_N^2} HPH^h\right] =$$

$$\det\left[I_{n_R} + \frac{1}{\sigma_N^2} \sum_{i=1}^{n_T} p_i H(i) H^h(i)\right] = \left\{1 + \sum_{i_1=1}^{n_T} \frac{p_{i_1}}{\sigma_N^2} \det[(H(i_1))^h H(i_1)] + \right.$$

$$\sum_{i_1=1}^{n_T} \sum_{i_2>i_1}^{n_T} \frac{p_{i_1}}{\sigma_N^2} \frac{p_{i_2}}{\sigma_N^2} \det[H^h(i_1, i_2) H(i_1, i_2)] +$$

$$\sum_{i_1=1}^{n_T} \sum_{i_2>i_1}^{n_T} \sum_{i_3>i_2}^{n_T} \frac{p_{i_1}}{\sigma_N^2} \frac{p_{i_2}}{\sigma_N^2} \frac{p_{i_3}}{\sigma_N^2} \det[H^h(i_1, i_2, i_3) H(i_1, i_2, i_3)] +$$

$$\ldots + \sum_{i_1=1}^{n_T} \sum_{i_1>i_2}^{n_T} \ldots \sum_{i_{n_T-2}>i_{n_T-2}}^{n_T} \frac{p_{i_1}}{\sigma_N^2} \frac{p_{i_2}}{\sigma_N^2} \ldots \frac{p_{n_T-1}}{\sigma_N^2}$$

$$\det[H^h(i_1, i_2, \ldots, i_{n_T-1}) H(i_1, i_2, \ldots, i_{n_T-1})] +$$

$$\sum_{i_1=1}^{n_T} \sum_{i_2>i_2}^{n_T} \ldots \sum_{i_{n_T-1}>i_{n_T-2}}^{n_T} \sum_{i_{n_T}>i_{n_T-1}}^{n_T} \frac{p_{i_1}}{\sigma_N^2} \frac{p_{i_2}}{\sigma_N^2} \ldots \frac{p_{n_T-1}}{\sigma_N^2} \frac{p_{n_T}}{\sigma_N^2}$$

$$\left. \det[H^h(i_1, i_2, \ldots, i_n) H(i_1, i_2, \ldots, i_{n_T})] \right\}.$$

6. A radio communication method, comprising:

(a) allocating transmission power of each of a plurality of base-band signals of a plurality of first transmitting antennae, which contain an information signal give from outside, using feedback information recovered from a feedback signal, modulating the plurality of base-band signals with the allocated transmission power, converting the modulated base-band signals into RF signals, and transmitting the RF signals, wherein (a) comprising (a1) determining whether the information signal is a pilot symbol, (a2) checking the presence of the feedback information if it is determined that the information signal is not the pilot symbol and (a3) recovering the feedback signal from the received feedback signal if it is determined that the feedback information is present; and (b) estimating the channel response experienced during the transmission of the RF signals, recovering the information signal from the RF signals using the estimated channel response, and transmitting the feedback signal containing information regarding the transmission power to be allocated, calculated using the estimated channel response, to the transmitter by radio.

7. The radio communication method as claimed in claim 6, wherein (a) further comprises:

(a4) allocating the transmission power of the plurality of base-band signals using the recovered feedback information;

(a5) modulating the plurality of base-band signals with the allocated transmission power by a predetermined modulation method; and (a6) converting the converted base-band signals into the RF signals, and transmitting the RF signals to the receiver.

8. The radio communication method as claimed in claim 7, wherein (a) further comprises:

(a7) equally allocating the transmission power of the plurality of base-band signals corresponding to the pilot symbol if the information signal is the pilot symbol, converting the plurality of base-band signals, and returning back to (a5).

9. The radio communication method as claimed in claim 8, wherein during (a2), the presence of the feedback information is checked repeatedly.

10. The radio communication method as claimed in claim 8, wherein (a) further comprises:

(a8) equally allocating the transmission power of the base-band signals if it is determined that the feedback information is not present in (a2), and returning back to (a5).

11. The radio communication method as claimed in claim 7, wherein (b) comprises:

(b1) receiving the RF signals transmitted in (a);

(b2) converting the RF signals received in (b1) into the plurality of base-band signals and processing the plurality of base-band signals;

(b3) determining whether the plurality of base-band signals processed in (b2) are for the pilot symbol;

(b4) estimating the channel response from the processed base-band signals that are for the pilot symbol if the plurality of base-band signals processed in (b2) are for the pilot symbol;

(b5) calculating the transmission power to be allocated to the plurality of base-band signals, using the estimated channel response;

(b6) modulating the calculated transmission power, converting the modulated transmission power into RF signals, and transmitting the RF signals as the feedback signals to the transmitter; and (b7) recovering the information signal from the plurality of base-band signals processed in (b2) if it is determined that the plurality of base-band signals processed in (b2) are not for the pilot symbol, using the estimated channel response.

12. A radio communication apparatus having maximum channel capacity, the radio communication apparatus comprising:

a transmitter for determining whether an information signal is a pilot symbol, checking the presence of feedback information if it is determined that the information signal is not the pilot symbol, recovering the feedback signal from a received feedback signal if it is determined that the feedback information is present, allocating transmission power of each of a plurality of base-band signals of each transmitting antenna containing the information signal input from outside, using the feedback information recovered from the feedback signal, modulating the base-band signals with the allocated transmission power, and converting the base-band signals into RF signals and transmitting the RF signals to a receiver, wherein the feedback signal is transmitted by radio from the receiver, and the transmitter comprises:

a plurality of receiving antennae for receiving the feedback signal transmitted from the receiver;

a feedback information recovering unit for recovering the feedback information from the feedback signal output from the plurality of receiving antennae, and for outputting the recovered feedback information;

a base-band processor for allocating the transmission power to each of the base-band signals of each of a plurality of transmitting antenna using the feedback information, and modulating the base-band signals with the allocated transmission power by a predetermined modulation method;

an RF processor for converting the base-band signals modulated by the base-band processor into RF signals, and outputting the RF signals; and at least one of a plurality of transmitting antennae for transmitting the RF signals output from the RF processor to the receiver.

13. A radio communication apparatus having maximum channel capacity and having a transmitter for allocating transmission power of each of a plurality of base-band signals of each transmitting antenna containing an information signal input from outside, using feedback information recovered from a feedback signal, modulating the base-band signals with the allocated transmission power, and converting the base-band signals into RF signals and transmitting the RF signals, the radio communication apparatus comprising:

a receiver for estimating a channel response experienced during the transmission of received RF signals, recovering the information signal from the received RF signals using the estimated channel response, and transmitting information regarding the transmission power of each transmitting antenna, which is calculated based on the estimated channel response and is to be allocated, as the feedback signal to the transmitter by radio, wherein the receiver comprises:

a plurality of receiving antennae for receiving the RF signals transmitted from a plurality of transmitting antennae of the transmitter;

a base-band processor for converting the RF signals received by the plurality of receiving antennae into the base-band signals and processing the converted base-band signals;

a channel estimator for estimating the channel response from a signal on a pilot symbol which is selected among the signals processed by the base-band processor, and outputting the estimated channel response;

an information recovering unit for recovering the information signal from the signals processed by the base-band processor using the estimated channel response;

an allocation power calculator for calculating the transmission power to be allocated to each of the base-band signals of the plurality of the transmitting antennae of the transmitter, using the estimated channel response;

an information feedback unit for modulating the transmission power calculated by the allocated power calculator, converting the modulated transmission power into RF signals and outputting the RF signals; and a plurality of transmitting antennae for transmitting the RF signals output from the information feedback unit as the feedback signal to a plurality of receiving antennae of the transmitter, wherein the allocation power calculator determines powers $p_1, p_2, \ldots, p_{n_r}$ which maximize channel capacity $C_{prop}$ as the transmission power to be allocated to the base-band signals of the plurality of the transmitting antennae of the transmitter, using the following equation:

$$C_{prop} = \log_2 \det\left[I_{n_R} + \frac{1}{\sigma_N^2} HPH^h\right],$$

$$\sum_{k=1}^{n_T} p_k \le p_T, P:\text{Diagonal}\{p_1, p_2, \ldots, p_{n_T}\}$$

wherein det denotes a determinant, I denotes a unit matrix, $n_R$ indicates the number of receiving antennae, $n_T$ denotes the number of the transmitting antennae of the transmitter, $\sigma_N^2$ denotes the dispersion of received Gaussian noise, H denotes a matrix of size $n_R \times n_T$ regarding the estimated channel response, $H^h$ denotes conjugate transpose matrix of H, $P_T$ denotes the total amount of power available in the plurality of the transmitting antennae of the transmitter, and P denotes a diagonal matrix.

* * * * *